Figure 3:
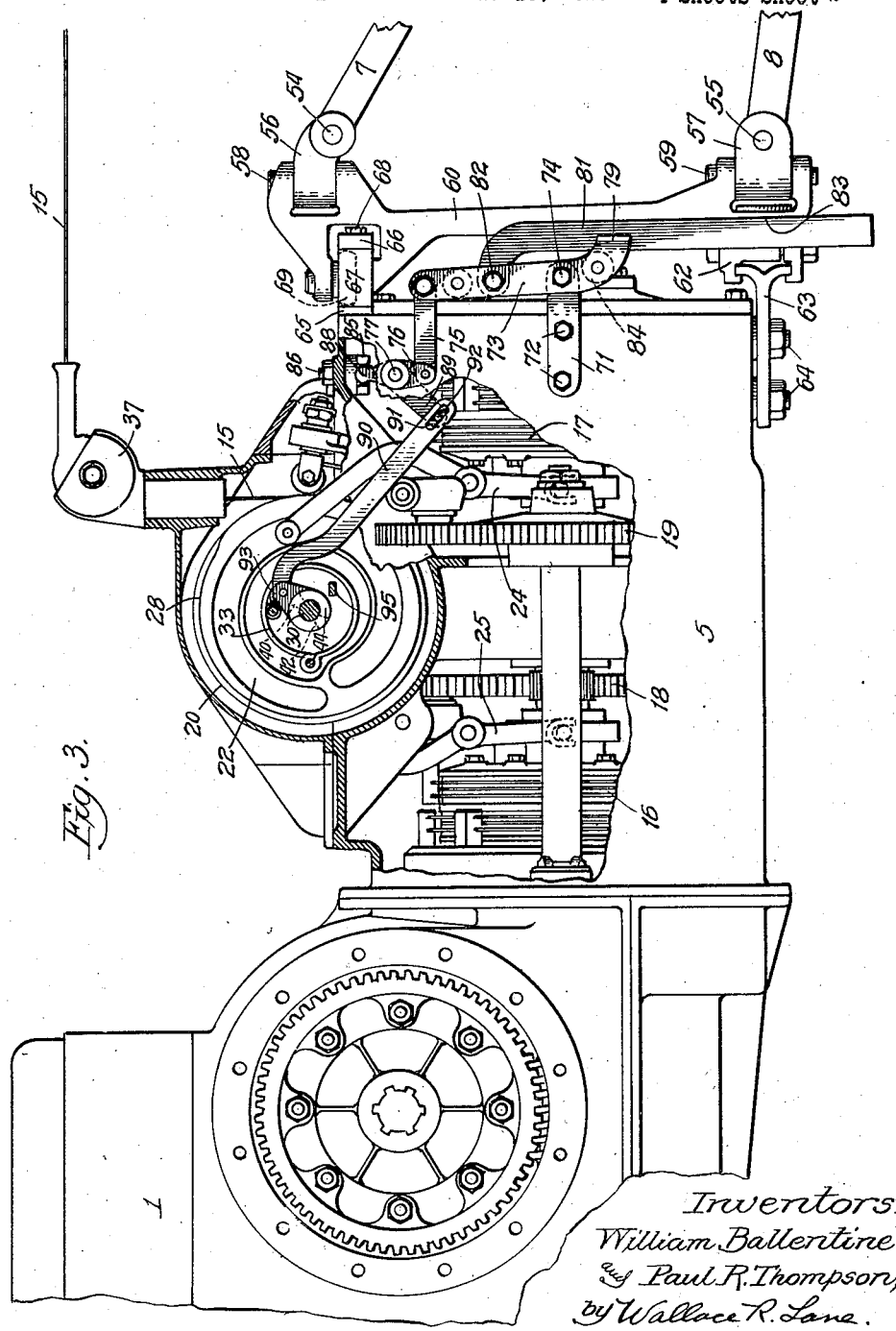

March 27, 1928.
W. I. BALLENTINE ET AL
1,663,790
AUTOMATIC CRAMP PREVENTIVE
Original Filed June 16, 1923    4 Sheets-Sheet 1
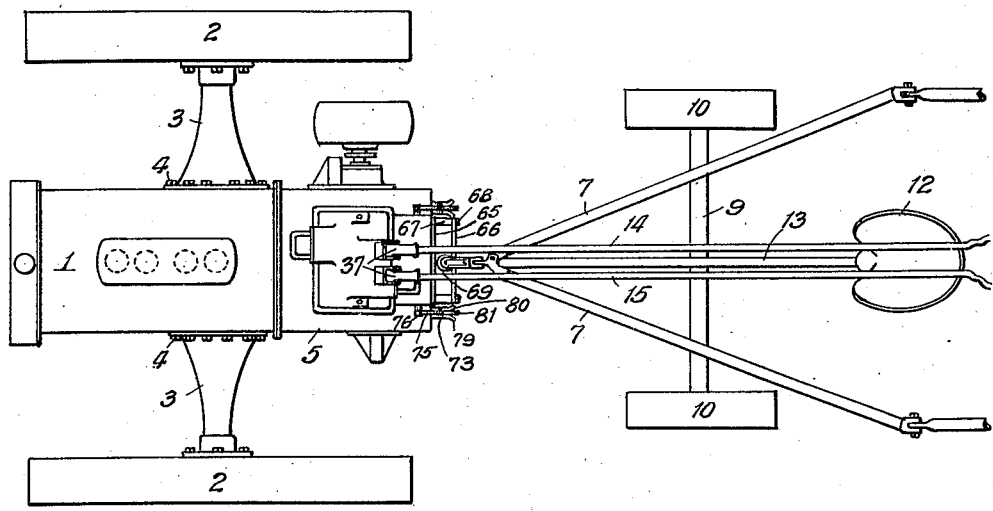
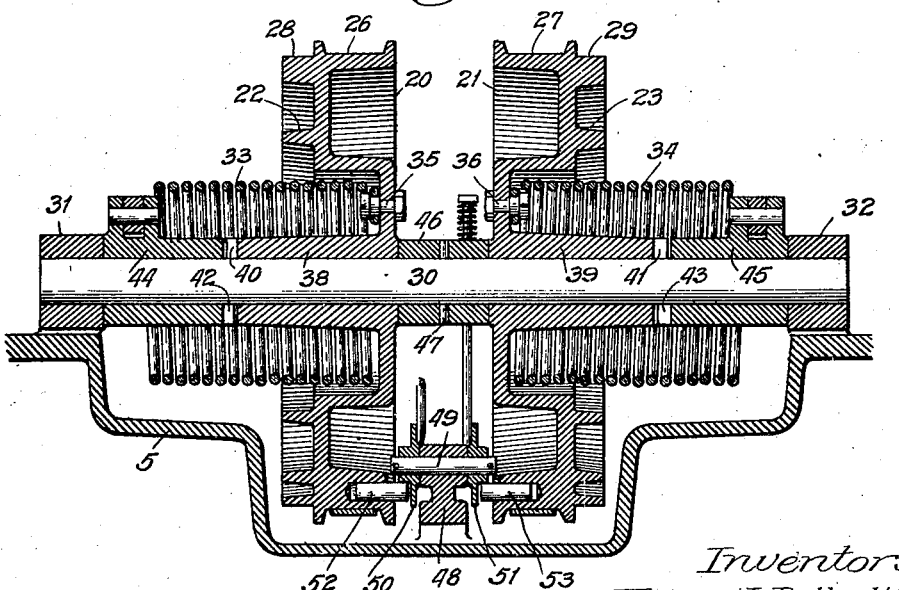
Inventors:
William I. Ballentine
& Paul R. Thompson,
by Wallace R. Lane.
Atty.

March 27, 1928.

W. I. BALLENTINE ET AL 1,663,790

AUTOMATIC CRAMP PREVENTIVE

Original Filed June 16, 1923　　4 Sheets-Sheet 2

Inventors.
William Ballentine
and Paul R. Thompson,
by Wallace R. Lane.
Atty.

March 27, 1928.

W. I. BALLENTINE ET AL 1,663,790

AUTOMATIC CRAMP PREVENTIVE

Original Filed June 16, 1923    4 Sheets-Sheet 3

Inventors:
William I. Ballentine
& Paul R. Thompson,
by Wallace R. Lane.
Atty.

March 27, 1928.
W. I. BALLENTINE ET AL
1,663,790
AUTOMATIC CRAMP PREVENTIVE
Original Filed June 16, 1923    4 Sheets-Sheet 4
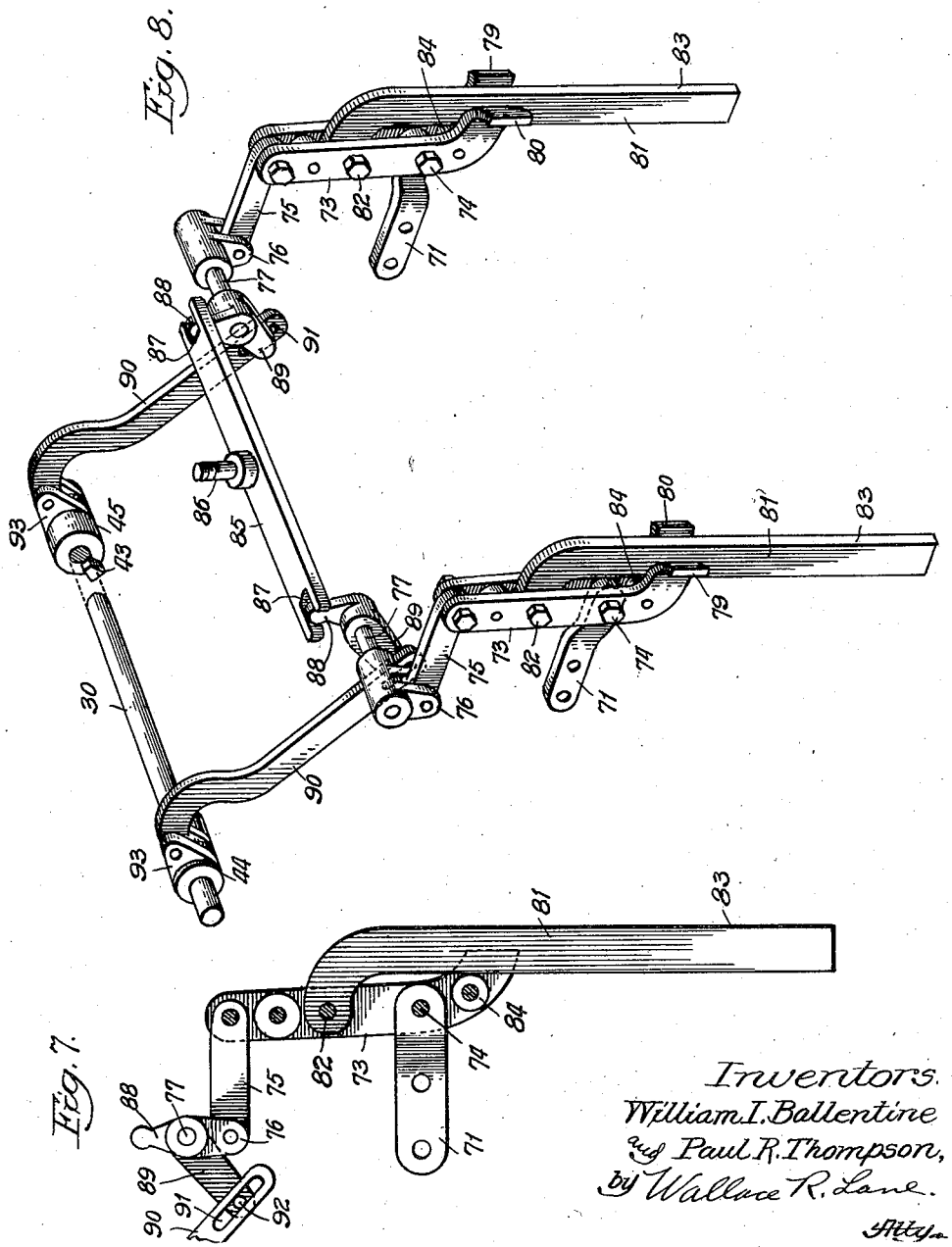
Inventors.
William I. Ballentine
and Paul R. Thompson,
by Wallace R. Lane.
Atty.

Patented Mar. 27, 1928.

1,663,790

UNITED STATES PATENT OFFICE.

WILLIAM I. BALLENTINE AND PAUL R. THOMPSON, OF LA PORTE, INDIANA, ASSIGNORS TO ADVANCE-RUMELY COMPANY, OF LA PORTE, INDIANA, A CORPORATION OF INDIANA.

AUTOMATIC CRAMP PREVENTIVE.

Original application filed June 16, 1923, Serial No. 645,751. Divided and this application filed June 25, 1923. Serial No. 647,610.

The present invention relates to tractors and the like having controlled mechanism for effecting different driving operations of the tractor.

This is a division of copending application Serial No. 645,751, filed June 16, 1923, for tractors.

Among the objects of the invention are to provide the control mechanism of a tractor with means for preventing the tractor and the implement driven thereby, whether drawn or pushed, from getting into an irreparable cramped condition; to provide for automatically modifying the normal action of the control means whereby the cramped condition will not be effected; to effect a change in the control mechanism for preferably bringing the driving mechanism, which may be causing the cramped condition, to a non-operative neutral condition or stop; to so effect the change in the control mechanism that it will be only operative to permit the driving mechanism to remove the cramp; to provide means which will allow for wear of parts, such as in the clutches of the driving mechanism, without interfering with or modifying the proper operation of the control mechanism; to provide means for selectively and automatically bringing to a stop or neutral operation that part of the driving mechanism which is producing or causing the cramping condition; and such further objects, advantages and capabilities as will later more fully appear and are inherently possessed by the invention.

It is to be understood that the word "driven" used in connection with a tractor driving the implement is generic throughout the specification and the claims to mean the tractor either pushing or pulling the implement.

In the drawings illustrating a preferred embodiment of the invention, Fig. 1 is a top plan view of a tractor embodying the invention; Fig. 2 is a transverse sectional view of part of the control mechanism; Fig. 3 is a side view, partly in section, of the tractor and the control mechanism, together with the cramp mechanism; Fig. 4 is a rear end view of the tractor; Fig. 5 is a top plan view, partly in section, of the cramp mechanism and a portion of the control mechanism and a reach to a driven implement; Fig. 6 is a detailed view, partly in section, of the cramp and control lugs; Fig. 7 is a side view, in detail, of part of the cramp mechanism, and Fig. 8 is a schematic view in perspective of the cramp mechanism.

Referring now more particularly to the drawings, the invention is shown as embodied in a tractor comprising a power plant 1, preferably of the internal combustion engine, supported upon a pair of bull wheels 2, rotatably mounted at the outer ends of a pair of axle housings 3, rigidly fastened or secured to the sides of the engine frame or block by any suitable means, as by bolts 4. At the rear end of the engine 1 is rigidly attached a housing 5 within which is located the power transmitting means and the control mechanism therefor, for the driving of the wheels 2. At the rear end of the housing 5 is attached a hitch mechanism to which are connected reaches 7 and 8 of a drawn implement suitably supported upon an axle 9 and wheels 10 as clearly shown in Fig. 1 of the drawing. A seat 12 for the driver may be supported by any suitable means 13 fastened to the drawn implement. A pair of reins 14 and 15 extend from the mechanism in the housing 5 to the seat 12 where they may be manually operated by the driver on the seat as will be later more fully explained. The cramp mechanism is attached to the rear end of the housing 5 and extends into the casing thereof.

Referring now more particularly to Figs. 2 and 3 of the drawings the engine is connected by means of a suitable shaft through clutches 16 and 17 suitably connected to drive gears 18 and 19 respectively connected operatively to drive the right and left hand wheels of the tractor. The clutch mechanisms are controlled by a pair of rein operated rein drums or sheaves 20 and 21 having cam channels 22 and 23 respectively co-operative with cam levers 24 and 25 connected to the clutch mechanisms to control their operations. The rein drums have rein receiving channels 26 and 27 on the peripheries of the drums and also have brake cams 28 and 29 respectively co-operable with brakes for effecting a retardation or stopping of the driving mechanism at the point desired. This is more fully explained in our copending application hereinbefore referred to.

The rein drums are rotatably mounted upon a cross-shaft 30 having its ends supported in bearings 31 and 32 forming a fixed part of the casing 5. To the drums are also connected springs 33 and 34 by means of bolts 35 and 36 at one end of the spring and to a fixed part of the casing 5 at the other ends of the spring. The rein drums are operated in one direction by a pull upon the reins, and operated in the opposite direction by the springs 33 and 34 when there is a let-up on the reins. The reins pass through, preferably, rein guards 37 which operate to swivel in accommodation of the direction in which the reins are pulled, and also to maintain the reins in clean and neat condition. The rein drums have hub portions 38 and 39 each provided with a control lug 40 and 41, in the path of movement of which are arranged cramp lugs 42 and 43 projecting from an end of cramp members 44 and 45 rotatably mounted upon the cross-shaft 30 between the hubs of the rein drums and the bearings at the ends of the shaft 30, as clearly shown in Fig. 2 of the drawing. Fig. 6 of the drawings shows the relative position of these lugs when the apparatus is in normal or neutral condition.

Between the drums is located a spacer 46 secured to the shaft 30 by means of a cross-pin 47. At the lower part of the casing 5 is located a control lock mechanism provided with a bearing 48 having a pin 49 upon which are rotatably mounted lock members 50 and 51, co-operable with pins 52 and 53 carried by the rein drums. The operation of this lock mechanism is disclosed in the copending application hereinbefore mentioned.

The hitch mechanism is, in the particular embodiment chosen for illustration, connected to the rear end of the tractor. The forward ends of the reaches 7 and 8 are pivotally connected by means of pivots 54 and 55 to members 56 and 57 which are in turn pivotally connected to vertical pivots 58 and 59 mounted in the upper and lower ends respectively of a vertical bar 60. The lower end of the bar 60 is suitably pivotally connected to a clamp 62 capable of lateral adjustment along a cross-rail 63 extending transversely of the casing 5 and fastened to it by means of bolts 64. The hitch may be adjusted and fastened in adjusted position laterally along the cross-rail 63 in order that the trailer may run at one side or the other of the tractor, as along a side row, or it may be fastened in the middle of the cross-rail so that the trailer or drawn implement may ride over a middle row or furrow, as shown in Figs. 1 and 5 of the drawing. At the rear upper part of the housing 5 is provided a roller raceway comprising a pair of plates 65 and 66 spaced apart by means of spacers 67 held in place by means of bolts 68. The upper end of the bar 60 carries a rotatable roller 69 adapted to ride between the plates 65 and 66 as a raceway, the plates being of sufficient width to accommodate for the arc movement of the roller 69, without the roller riding off of either plate 65 or 66.

Oftentimes, when making a short turn or in backing, the tractor and the implement driven thereby may assume such an angular relation to each other as to throw them into a cramped position. To obviate this difficulty the tractor is provided with means for automatically operating upon the control mechanism, independent of the action of the operator upon the reins, to bring the tractor and the implement driven by it to a stop so as to prevent further cramping. The operator may then manipulate the reins to effect a change in the control mechanism so that the tractor will pull out of the cramp.

The mechanism for stopping the operation when getting into a clamped position is more particularly shown in Figs. 3, 4, 5, 7 and 8, and comprises a pair of bracket members 71 rigidly secured to the sides of the housing 5 by means of bolts 72 and levers 73 pivotally mounted upon the brackets 71 by pivot bolts 74. Each lever comprises a pair of plates spaced apart for the purpose hereinafter described. The upper ends of levers 73 are pivotally connected to links 75, the other end of these links being pivotally connected to crank arm 76 fastened to the outer ends of short-shaft 77 rotatably supported in bearings 78 formed in the sides of the housing 5, as shown in Fig. 5 of the drawings. Each lever 73 comprises a pair of space bars formed at the lower end with diverging portions 79 and 80 so as to form an entry therebetween for a lever or contact arm 81 pivotally mounted between the side members of the levers 73 by means of a pivot 82 as clearly shown in Figs. 7 and 8 of the drawings. Each lever or arm 81 has a lower depending portion 83 which will lie in the path of the swing of a reach bar 7 or 8 of the driven implement. When the implement is swung to one side toward a clamped position with respect to the tractor, as shown in dotted lines in Fig. 5 of the drawings, one of the members 7 or 8 will hit against the lower end 83 of the lever 81 and move the same forwardly. The lever 81 will then contact with a spacer 84 connected to and between the side members of the lever 73 and cause the latter to move about the pivot 74 and to move the links 75 rearwardly thus pulling upon the crank arm 76 and turning the short-shaft 77.

Within the casing or housing 5 is pivotally mounted a cross-bar 85 by means of a pivot 86 having a bearing in the upper wall of the housing 5, and having end notches 87 each receiving an upper rounded end of an arm 88 secured to the inner end of each of the short-shafts 77. Each arm 88 has rigid therewith a second arm or crank 89 pivotally connected to a link 90, the latter having an elongated slot 91 in which is adapted to play, loosely, a pin or pivot 92 fixed to the arm 89. The other end of the link 90 is pivotally connected to ears 93 forming a rigid or integral part of the cramp member 44 or 45 depending on which side of the tractor the structure is referred to.

When the driven implement moves toward a cramped position, such as that shown by dotted lines in Fig. 5 of the drawings, one of the reaches, such as reach 8, will contact with the lower end portion 83 of the arm 81 to effect a turning of one of the shafts 77. Assuming that the cramp is made on the left hand side of the tractor and the driven implement as shown in dotted lines in Fig. 5 of the drawings, the left hand lever 81 will effect a rotating of the left hand short-shaft 77 so that the end of the arm 88 will cause a forward swing of the left hand end of the cross-bar or lever 85 and cause the other end of the cross-bar 85 to swing rearwardly. The right hand short-shaft 77 will then be caused to rotate and the right hand arm 89 will be swung forwardly until the pin 92 thereof will come in contact with the forward end of the slot 91 and then move the link 90 forwardly so as to rotate the right hand cramp member 45 with the projection 43 carried thereby. The normal position of this projection 43 is shown in Fig. 2 of the drawings. As cramp member 45 is rotated with this projection 43 it will be caused to move upwardly toward the projection 41 carried by the hub of the right hand rein drum. During the same time a left hand arm 89 will swing rearwardly until the pin 92 thereof will come into contact with the rear end of the slot 91 in the left hand link 90 and then move the latter rearwardly, thus causing a rotation of the left hand cramp member 44 with the projection 42 carried thereby. This projection will move in an opposite direction from the projection 43, that is to the left or clockwise as viewed in Fig. 6 of the drawings.

The neutral positions of the lugs or projections 40 and 42 or 41 and 43 are shown in Fig. 6 of the drawings. If, therefore, we assume that a cramp is appearing on the left side when driving forward and with the left wheel pivoting and the right wheel turning or causing the cramp, the left hand clutch mechanism will be in non-operative, neutral condition and there is no driving effect on the left wheel. The left lug 40 will be in neutral position and the operation of the cramp mechanism is to cause the left lug 42 to move anti-clockwise as viewed in Fig. 6 of the drawings, but the lug 42 cannot travel far enough to reach the lug 40 which is in its neutral position. On the right hand side the rein drum has been turned in a clockwise direction, as viewed from Fig. 3 of the drawings, for the forward driving operation of the right wheel. The right control lug 41 also shall have been moved in a clockwise direction toward the cramp lug 43, as viewed in Figs. 3 and 6 of the drawings. Now when the cramp mechanism operates, the cramp lug 43 will be moved in an anti-clockwise direction and into contact with the control lug 41 and will carry the latter together with the rein drum and cams connected to it, toward or to neutral position, thus bringing the transmission mechanism for the right hand wheel to a stop or neutral operating position and thus prevent going further into a cramp. This is done automatically without any control or operation of the reins by the operator. A letting-up on the right hand rein by the operator will not effect the forward operation of the right hand wheel because the position of the right hand cramp lug 43 will prevent it. The left hand cramp lug 42 is so located that it will prevent the left wheel from being operated rearwardly should the operator pull on the left hand rein.

To pull out of cramped position the operator may either pull on the right hand rein to effect a rearward drive of the right hand wheel or let up on the left hand rein to effect a forward drive of the left hand wheel, or both. In the event of pulling on the right hand rein the right control lug 41 will be free to move anti-clockwise away from the stopped position of the right cramp lug 43, and in the case of letting up on the left rein the left control lug 40 is free to move in a clockwise direction away from the stop position of the left cramp lug 42.

If, in the above operation, the left hand wheel was moving forward instead of merely pivoting, the operation of the cramp mechanism would be the same, the left side transmission mechanism being in operating condition instead of stop, and the stopping of the transmission mechanism for the right hand wheel having the effect of letting the left wheel pull the tractor out of a cramp.

It now is assumed that the cramp occurred when backing or traveling rearwardly, the left hand wheel is the one causing the cramping and is the one brought to a stop, the right hand wheel either merely pivoting or traveling rearwardly more slowly but toward releasing of the cramping when the left hand wheel is stopped. The rotation of the cramp lugs will be the same as before. For the rearward drive operation, the left hand control lug 40 shall have moved anti-clockwise as viewed in Fig. 6 of the drawings, so that when the cramp mechanism operates to move the left hand lug 42 clockwise the latter will move the lug 40 and the parts connected to it back to neutral position, and thus bring the transmission mechanism for the left wheel to a stop. This prevents further cramping on the left side. On the right side the cramp lug 43 is in a position to prevent a forward operation of the right wheel, but the control lug 41 is free to move anticlockwise for rear driving operation when the operator pulls on the right hand rein. This will release cramp by a rearward drive of the right wheel. The cramp may also be released by a forward drive of the left wheel. After the left wheel has been brought to a stop the operator may manipulate the left rein to cause a let-up to effect a starting of the left hand wheel forwardly for this purpose.

Stationary stops 95 (see Fig. 3) may be provided to limit the downward movement of the ears 93, to which the links 90 are pivotally connected, in order to prevent the links and the ears getting into a "dead center."

If there is a right hand cramp the right hand lower reach member 7 will contact with the right hand arm or lever 81 to cause it to operate through cross lever 85 to effect a stopping of the clutch mechanism similar to that described above for the left hand cramp. It is believed that this operation will be clear without further description, the operation being converse.

The rein drums and the cams carried thereby will have a certain amount of angular movement within which the operating mechanism will be in neutral operation, or to say, the transmission mechanism being in stopped condition. Assuming that the clutches are new with the surfaces of them of unworn condition, the amount of angular movement of the drums and cams to effect the clutching operation, that is from the position where there is a full clutch-in of the clutches to the position where there is an unclutching and the beginning of the neutral range of movement, there is no danger of the cramp lugs interfering with the movement of the control lugs carried by the hubs of the drums. If, however, the clutch surfaces become worn, the drums together with the cams carried thereby, will need to be rotated a greater amount in angular movement to reach the positions of full clutch-in. In such cases the control lugs may travel so far as to come in contact and engage the cramp lugs and carry the cramp lugs along therewith. In this event the cramp mechanism would be operated in reverse direction. If we consider a straight forward or straight rearward driving, it would mean that both links, assuming that they did not have elongated slots, would press in the same direction against the pins 92 and result in tending to move the ends of the cross-bar 85 in the same direction, and, therefore, become locked on the fulcrum pin 86. This would cause a locking of the mechanism and prevent the desired driving operation. In order to avoid this the links are provided with elongated slots 91 so that the links 90 will have loose play with respect to the crank pins 92 and have no effect in tending to move the crank arm 89 in either direction. There will, therefore, be no locking action by way of the cross-bar 85 and the fulcrum pin or pivot 86.

If the clutches are worn and when driving around a curve where one wheel is driving at a greater rate than another, lack of such slots would permit one of the control lugs to contact with one of the cramp lugs, and operate the cramp mechanism reversely so that one of the depending arms 81 would be swung rearwardly and the other forwardly. In this case if the cramping started to take place toward the depending arm 81 extending rearwardly, the stopping of the tractor would be effected too early in the tendency to stop it from cramping action. On the other hand if the cramping was toward the other side of the tractor, the contact of the reaches with the other arm 81 would be too late and the cramp might be irreparable. It may be also that the arm 81 might be swung so far upwardly as to be clear of the reach bars 7 or 8 so that the cramp preventing mechanism would never operate although the tractor and the implement driven by it would be in a sharp cramp. In the case where the arm 81 was swung too far rearwardly so that the reach bars 7 or 8 would contact with it too early, it might produce the result of continually stopping the tractor when turning an ordinary curve not sharp enough to produce a cramp. It will, therefore, be seen from the above that the elongated slots in the links are highly important to prevent these disadvantages.

It is to be understood that the foregoing slot features will not be necessary where the cams are proportioned to require less angular movement from full forward to full rearward or extreme positions of the control lugs, in which positions the control lugs will not interfere with the cramp lugs notwithstanding great wear of the clutch surfaces. Consequently, the pins 92 need only fit into apertures therefor rather than slots.

While we have herein described and shown upon the drawings a preferred embodiment of the invention, it is to be understood that the invention is not limited to the particular construction, details and arrangement of parts shown and described, but that other constructions, details and arrangements of parts are comprehended by the invention

Having now described our invention, we claim:

1. In a tractor having driving mechanism and control means therefor, comprising a rein operated control element having a projection, a hitch operated member having a projection co-operable with the projection on the control element for effecting a stop control of the driving mechanism when the hitch operated member is operated by a driven implement when moving toward a cramped position.

2. In a tractor having driving mechanism and control means therefor, comprising movable rein operated control elements having control lugs, movable cramp lugs arranged in the path of movement of the control lugs, movable means connected to the cramp lugs and having contact members for engagement therewith of an implement driven by the tractor when going toward a cramped position, whereby a cramp lug co-operates with a control lug to effect a stopping of the driving operation of the driving mechanism causing the cramping.

3. In a tractor having driving mechanism and control means therefor, comprising relatively movable members provided with lugs arranged to move in the path of movement of each other, one of said members being operatively associated with the driving mechanism to effect a forward, neutral or rearward driving operation of the tractor, the other of said members being operatively associated with an implement driven by the tractor whereby when the tractor and implement move toward a cramped position the implement causes said other member to interfere with the first member to effect a neutral driving operation of the tractor.

4. In a tractor having driving mechanism and control means for effecting forward, neutral and rearward driving operations of the driving mechanism, comprising movable rein controlled members operatively associated with the driving mechanism to effect said driving operations, movable means arranged to be moved by a driven implement when moving toward a cramped position with the tractor, said controlled members and said movable means having relatively movable and mutually engageable projections adapted to effect a movement of the rein control member to neutral driving control position upon the movement of the movable means by the driven implement whereby the driving mechanism tending to cause a cramping is brought to a stop.

5. In a tractor having driving mechanism and control means for effecting forward, neutral and rearward driving operations of the driving mechanism, comprising a drum operatively associated with the driving mechanism to effect said different driving operations, a reach connected to the tractor and the implement driven by the tractor, a movable member located in the path of movement of the reach when the tractor and implement move toward a cramped position, and means connected to the movable member and to the drum and having relatively movable and mutually engageable projections operable when engaged to bring the drum into neutral controlling position when the reach actuates the movable member.

6. In a tractor having driving mechanism and control means for effecting forward, neutral and rearward driving operations of the driving mechanism, comprising a drum operatively associated with the driving mechanism to effect said different driving operations, a reach pivotally connected to the tractor for lateral swing thereof relative to the tractor, an agricultural implement connected to the reach, an arm carried by the tractor and located in the path of movement of the reach when the tractor and implement move toward cramping position whereby the arm is operated by the reach engaging it, and means connected to said arm and to the drum and having relatively movable and mutually engageable projections operable when engaged to bring the drum into or hold the drum in neutral controlling position when the reach actuates the arm and thus prevent a cramp.

7. In a tractor having driving mechanism and control means for effecting forward, neutral and rearward driving operations of the driving mechanism, comprising a drum operatively associated with the driving mechanism to effect said different driving operations, a reach pivotally connected to the tractor for lateral swing thereof relative to the tractor, an agricultural implement connected to the reach, an arm carried by the tractor and located in the path of movement of the reach when the tractor and implement move toward cramping position whereby the arm is operated by the reach engaging it, and lever mechanism connected to said arm and to the drum and including elements movable in a common path and mutually engageable to bring the drum into and hold the drum in neutral controlling position when the reach actuates the arm and thus prevent a cramp.

8. In a tractor having driving mechanism and control means for effecting forward, neutral and rearward driving operations of the driving mechanism, comprising a drum operatively associated with the driving mechanism to effect said different driving operations, a reach pivotally connected to the tractor for lateral swing thereof relative to the tractor, an agricultural implement connected to the reach, an arm carried by the tractor and located in the path of movement of the reach when the tractor and implement move toward cramping position whereby the arm is operated by the reach engaging it, and lever mechanism connected to said arm and to the drum having interfering elements operable to bring the drum into or hold the drum in neutral controlling position when the reach actuates the arm and thus prevent a cramp, said lever mechanism including a link operatively associated with the drum for effecting its controlling position.

9. In a tractor having driving mechanism and control means for effecting forward, neutral and rearward driving operations of the driving mechanism, comprising a pair of rein controlled drums operatively associated with the driving mechanism for effecting said different driving operations, cramp control means including movable members being normally out of engagement with the drums but adapted to engage the drums when the implement and tractor move toward cramped position, and means connected to said members and actuated by an implement driven by the tractor when the implement and tractor move toward cramped position for effecting a neutral positioning of the drum.

10. In a tractor having driving mechanism and control means for effecting forward, neutral and rearward driving operations of the driving mechanism, comprising rein control drums having control lugs, movable members having cramp lugs co-operable with the control lugs for effecting a neutral control of the drums when a cramp is being formed between the tractor and an implement driven by it, cramp mechanism including a movable element arranged to be moved by the implement when moving toward a cramping position and links operatively connected to said elements and said members, said links having loose play to compensate for wear of parts in the driving mechanism.

11. In a tractor having driving mechanism and control means for effecting forward, neutral and rearward driving operations of the driving mechanism, comprising rein controlled drums having control lugs, movable members having cramp lugs co-operable with the control lugs for effecting a neutral control of the drum when a cramp is being formed between the tractor and an implement driven by it, cramp mechanism including movable elements arranged to be moved by the implement when moving toward cramping position and links operatively connected to said elements and said members, said links having elongated slots for loosely receiving pins connected to the elements whereby wear in the parts of the driving mechanism may be compensated for.

12. In a tractor having driving mechanism and control means for effecting forward, neutral and rearward driving operations of the driving mechanism, comprising movable rein controlled drums co-operable with the driving mechanism to effect different driving operations thereof in different portions of the drum and having control lugs, movable cramp members having lugs arranged in the path of movement of the control lugs and capable of engagement therewith for effecting neutral control of the drums when a cramp is being formed between the tractor and an implement driven thereby, cramp mechanism including movable elements arranged in the path of movement of the implement when moving toward cramped position, said cramp mechanism including links connected to said cramp members, and levers connected to said elements, said links having elongated slots and said levers having pins extending into the slots.

In witness whereof, we hereunto subscribe our names to this specification.

WILLIAM I. BALLENTINE.
PAUL R. THOMPSON.